Aug. 14, 1956
M. AUWÄRTER
2,758,510
INTERFERENCE FILTER FOR SUN GLASSES
Filed April 28, 1950
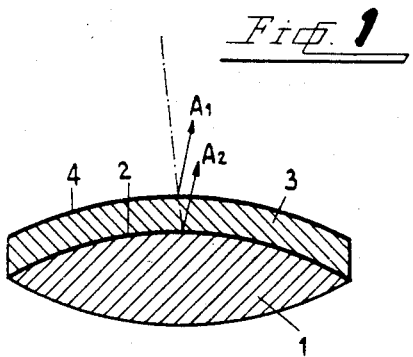
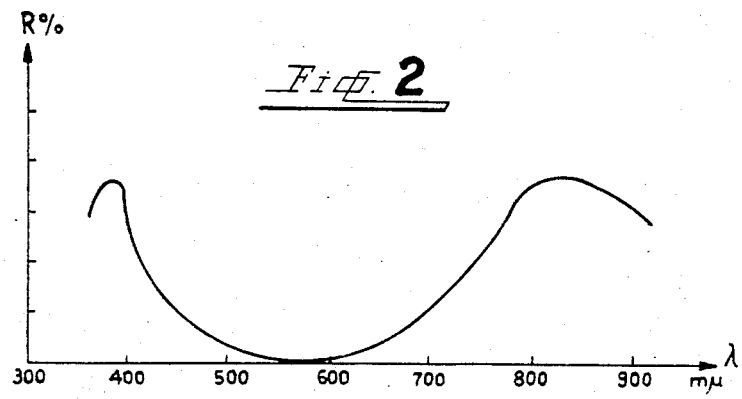
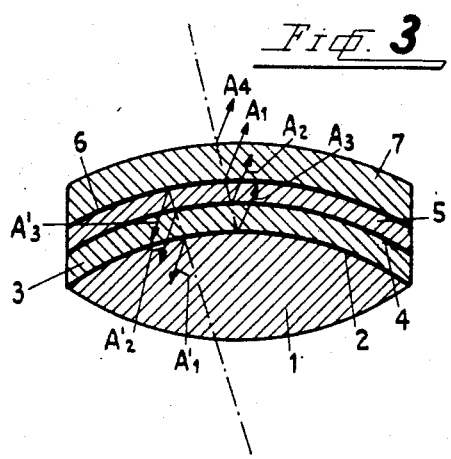
INVENTOR
MAX AUWÄRTER

United States Patent Office 2,758,510
Patented Aug. 14, 1956

2,758,510

INTERFERENCE FILTER FOR SUNGLASSES

Max Auwärter, Vaduz, Liechtenstein, assignor to Alois Vogt, Vaduz, Liechtenstein Application April 28, 1950, Serial No. 158,752

Claims priority, application Switzerland April 28, 1949

1 Claim. (Cl. 88—106)

The present invention relates to optical glasses provided with protection means for protecting the human eye against harmful rays and is in particular suitable for sun glasses.

For producing such glasses the following possibilities have hitherto been proposed:

By means of suitable colour pigments the mass of the glass flux is coloured in such a manner that the finished glass has the curve of perviousness required. This method, however, has the disadvantage that spectacle glasses produced and ground in such a manner are varyingly pervious corresponding to their varying thickness so that convex glasses are more absorbent in the centre than towards the edge, whereas of concave glasses the opposite is true. In addition the colouring itself causes certain difficulties if a definite distribution of the spectral absorption is to be achieved, and if the extinction of the colouring is related to the same thickness of layer, said distribution of absorption varies in general from glass flux change to glass flux change so that a uniform production is difficult to achieve.

According to another method of protection the actual lens consisted of normal untinted glass which was provided with a covering glass of coloured mass which is applied to one of the surfaces of the lens. Thus a uniform perviousness over the whole surface of the optical glass could be achieved, but already during production of the glass care had to be taken that on fusing the covering glass to the lens as a base the approximate final geometrical shape had to be considered. As a consequence this latter method and structure entailed a decidedly greater number of rejects than glasses coloured in the mass as a whole.

Recently sun glasses have been produced with thin metal coatings applied to the ground glass body by means of physical or chemical methods, said coatings reducing the perviousness of the optical glass because of the metallic absorption aimed at. This method, however, has the disadvantage that the capacity of reflection of the metallic layer is very high so that such spectacles act as mirrors. If the metallic layer is provided with an additional non-metallic covering layer which causes interference of the rays reflected from the metallic layer and the covering layer, a reflection of coloured light is caused instead of a metallic reflecting mirror. In both cases protective spectacles produced in this way have a decidedly and for the surroundings startling effect so that such protective glasses only find a limited market.

The present invention eliminates all the disadvantages hitherto mentioned. The optical glasses according to the present invention are characterized by at least one absorbing surface layer which for the reduction of the reflection consists of at least two thin metallically reflecting partial layers with a dielectric substance therebetween the thickness of which is such that the rays of light reflected from the boundary surface of the metallic layers for a medium wave length of light are practically cancelled out in the spectral region desired to be penetrated by interference. The method for the production of optical glasses according to the present invention is characterized in that the glasses are provided with several partial layers of reflection-reducing and absorbing layers.

By way of example two embodiments of the present object of invention are shown in the drawing accompanying and forming part of this specification, in which:

Fig. 1 is a cross-section through a lens provided with two metallic partial layers on its own surface and with a dielectric substance therebetween.

Fig. 2 illustrates the curve of the reflection as a function of the wave length of the incident light with respect to an optical glass prepared according to the present invention, and Fig. 3 is a cross-section through a modified lens provided with three metallic partial layers on its own surface and with dielectric substances as well as a protective layer therebetween, said lens being adapted reducing reflections in both directions of the optical axis.

As a result of modern research it is required of good protective glasses for the human eye, such as sun glasses, that the glasses absorb or reflect as completely as possible the short-wave light having wave lengths of less than 320 m$\mu$ and light in the spectral region having wave lengths of 760–1300 m$\mu$ since the eye may be harmed considerably by such light rays, the long-wave light rays in particular causing permanent damage to the eye. The long-wave ultra red rays having wave lengths of more than 1300 m$\mu$ only may harm the eye in the outermost regions so that no special precautions are required for such rays. The visible spectral region of 420–760 m$\mu$ wave length should pass through the protective glass with as small a change in colour impression as possible, and also with as great a reduction as possible in light intensity.

The lens 1 shown in cross-section in Fig. 1 is provided according to the invention on one of its surfaces with a very thin metallic partial layer 2, a non-metallic dielectric substance 3 disposed thereupon and finally with a thin metallic partial layer 4. The metallic partial layers 2 and 4, which may be of different thicknesses, by way of example, consist of chromium and are preferably so thin that the incident rays of light pass, by way of example, through the lower partial layer 2 to the amount of approximately 50% and through the top partial layer 4 to the amount of approximately 75%. The remaining 50% and 25% respectively are partially absorbed and partially reflected by the metal. The dielectric substance 3 disposed between the two metallic partial layers is practically completely translucent and is several times thicker than the two partial layers 2 and 4. By way of example it consists of SiO (silicon monoxide) and has a thickness of approximately $n\lambda/4$, $\lambda$ being the mean wave length of the light transmitted through the dielectric substance, i. e. the visible light disposed approximately in the center of the spectral region which it is desired to transmit through lens 1 and which has no deleterious effect upon the human eye; and $n$ being any odd unit number. The thickness of the whole layer built up of the partial layers is approximately .1$\mu$.

The purpose and the mode of action of the absorbing surface layer described is as follows:

The incident light of any desired wave length is reduced on passage through each of the two metallic partial layers 4 and 2 which reduction is 25% in the top layer 4 and 50% in the bottom layer 2 in the example given so that only approximately 37% of the incident light penetrates the lens. The human eye looking through the glass is consequently protected from excessive light penetration. At the other boundary surface between the metallic partial layer 4 and the surrounding air a part of the incident light is reflected. The desired amplitude of the reflected light is designated $A_1$. At the boundary surface of the lower metallic partial layer 2 toward the dielectric substance 3 a certain portion of that light which has penetrated is again reflected. The amplitude of the light reflected at this point is $A_2$ and is larger than $A_1$ since the lower partial layer 2 is denser according to its greater capacity of absorption and thus reflects better. A small part of the light reflected from the lower partial layer 2 again is reflected from the upper layer 4 whereas according to the example given approximately 75% thereof penetrates this partial layer outwardly. By suitable choice of the perviousness of the outer metallic partial layer 4 and the capacity of reflection of both metallic partial layers it is possible to make the amplitude of the light reflected from the partial layer 2 and passing again outwardly equal to the amplitude $A_1$. Due to the differential time of passage of the light in the air and in the dielectric substance 3 the waves created by reflection at the two partial layers 2 and 4 are displaced relatively to each other as regards their phase so that interference occurs. Now if as described the dielectric substance 3 has the thickness of an odd multiple number of the $\lambda/4$ of the optical path, the reflected rays for a light wave length of $\lambda$ cancel themselves out since one of the reflected rays is displaced in its phase by half a wave length in relation to the other reflected ray due to its double passage through the dielectric substance 3. Consequently the resulting reflection of such an absorbing layer is equal to zero for light rays of wave length $\lambda$.

For light of other wave lengths the phase relations are different so that no complete extinction of the two reflected partial rays takes place. It is easy to understand that in a boundary case their amplitude can even be additive, the capacity of reflection of the layer then being very great and thus its perviousness to light rays of this wave length being less. According to known physical laws these boundary cases occur at wave lengths which are greater or smaller by the factor $\sqrt{2}$ than those wave lengths at which minimum reflection occurs. Two points of maximum reflection are each separated from each other by the factor 2 as regards their wave lengths and are thus separated in the spectral region by exactly an octave.

In Fig. 2 the curve of reflection R of an optical glass prepared in the manner described is illustrated diagrammatically as a function of the wave length of the incident light. The thickness of the dielectric substance 3 is so chosen, that, with a wave length of 560 m$\mu$, extinction of the reflection takes place. Towards either side of the spectral region the reflection becomes smaller and smaller and attains a maximum of about 36% of the incident light at 400 m$\mu$ and 800 m$\mu$.

From the foregoing it is apparent that optical glasses provided with the absorbing layer or layers according to the present invention are highly suitable for the protection of the human eye. In the region of the greatest sensitivity of the eye the capacity of reflection of the layer is substantially zero or very small so that practically no mirror effect thereof can be seen whereas the harmful spectral region of the ultra red rays reflects strongly and thus only is allowed to penetrate weakly, as is also the case with ultra violet rays having a wave length in the region of 400 m$\mu$.

The dielectric substance 3 in addition substantially completely prevents penetration of light rays in the entire short-wave region of the wave lengths below 350 m$\mu$ by a suitable choice of said substance such as, for example, the compound SiO.

An optical protective glass prepared according to the modification of Fig. 1 is reflection-reducing for incident light in one direction only of the optical axis since the condition of equality of the amplitudes of the two reflected rays is no longer satisfied due to the different perviousness and capacity of reflection of the two metallic layers for incident light from the other direction. To achieve freedom from reflection and protective action in either direction to the same degree it would serve the purpose of the present invention to provide both surfaces of the optical glass lens with the aforedescribed absorbing layers.

However, it is also possible to achieve a reduction of reflection in either direction of the visual axis according to the modification of Fig. 3 wherein at least three metallic reflecting partial layers 2, 4 and 6 with the dielectric substances 3 and 5 therebetween are provided on one surface only of the glass 1. A light ray incident from the side of the layers is partially reflected from all three metallic partial layers. The desired amplitudes of the reflected rays are designated $A_1$, $A_2$ and $A_3$ respectively, the sizes of said amplitudes depending on the capacity of reflection of the respective partial layer as well as on the fact that the perviousness of the metallic partial layers disposed in front is further reduced by absorption and partial reflection on the return passage. This thickness of the two interposed dielectric substances 3 and 5 may be different and may be chosen in such a manner that the phases of the reflected rays again issuing from the complete layer are disposed in relation to each other in such a manner that for a medium wave length lying in the spectral region to be pervious the three reflected rays are cancelled out due to interference. This is possible as soon as the vector diagram of the three waves is closed which condition can always be achieved by changing at least one of the angles of phase and at least one of the amplitudes.

With the described arrangement of the partial layers a greater freedom from reflection is attained than is required for achieving a reduction of reflection in one direction so that with the same partial layers a freedom of reflection for either direction of the visual axis for a certain wave length can be simultaneously achieved by suitable choice and dimensioning of said layers. In this case the rays of reflection designated $A_1$, $A_2$ and $A_3$ in Fig. 3 of the one direction of incidence of the light will each simultaneously cancel out the rays of reflection designated with $A_1'$, $A_2'$ and $A_3'$ of the other direction of incidence of the light.

Naturally it is also possible to protect the metallic partial layer disposed outermost against scratching and oxidation by a thin protective layer resistant to scratching and to the action of chemicals. In Fig. 3 such a protective layer 7 is shown. Its thickness is with advantage chosen to be $n\lambda/2$, $n$ being any unit number and $\lambda$ the wave length resulting from the passage through the protective layer for which the reduction of reflection takes place. With this thickness of layer 7 the condition of interference remains the same as if no protective layer were present. The light reflected from the surface of the protective layer 7 has in general so small an amplitude $A_4$, that said protective layer hardly acts detrimentally. In addition it is possible to take said protective layer into consideration in building up the absorbing protective layer in such a manner that the amplitude $A_4$ is necessary to achieve a complete freedom of reflection in combination with the reflected rays $A_1$, $A_2$ and $A_3$. With the aid of such a protective layer the whole optical effect can be furthermore increased in such a manner that interference besides the maximum perviousness is influenced additionally so that an even greater protective action of the optical glass can be achieved.

For said protective layer the same material can be used as for the dielectric substances, by way of example SiO.

A light-absorbing and reflection-reducing layer built up of six partial layers according to Fig. 3 has a total thickness of only approximately .4$\mu$.

Obviously it is also possible to displace the maximum perviousness and at the same time the reduction of reflection within the visible spectrum by a suitable choice of the thickness of the dielectric partial layers in such a manner that the most suitable physiological effect is created for the eye and for the colour impression. Furthermore more than two and three metallically reflecting partial layers respectively with dielectric substances interposed therebetween can be provided for achieving definite filtering effects.

It is obvious that during the process of manufacture of the reflection-reducing, light-absorbing layers the thickness and the refractive capacity of the dielectric partial layers as well as the capacity of absorption (which may be due to relative thickness) and of reflection of the metallic partial layers cannot always be exactly the same and be maintained with unvarying precision so that the optical glasses produced do not always show a complete freedom of reflection and the achieved minimum of reflection is not always present with all samples at exactly the same wave length. Since, however, according to Fig. 2 the curve of reflection in the middle portion of the spectrum is in any case very flat, the slight displacements of the wave length present at minimum reflection have practically no influence on the protective effect of the glass. Similarly if slight residual minimum reflection should occur, when the desired condition of amplitude is not exactly attained, practically no detrimental effect will ensue. It has been proved that the reduction of reflection is in general sufficiently great if the amplitudes $A_1$ and $A_2$, and $A_1'$ and $A_2'$ respectively of the reflected rays are of approximately the same size in the embodiments of Figs. 1 and 3.

The following substances are particularly suitable for the production of the thin metallic reflecting layers in accordance with the practice of the invention:

Chromium, zirconium, titanium, vanadium, molybdenum, etc. The dielectric substances and the protective layer, if present, may consist of the following substances:

Oxides of the groups Ib, II, III, IV, V, VI, VII, VIII of the periodic system, in particular the metal oxides such as $SiO$, $SiO_2$, $GeO$, $GeO_2$, $ZrO$, $ZrO_2$, $TiO$, $TiO_2$, $Al_2O_3$, etc. as well as ovides of the rare earths;

Fluorides of the groups II, III, IV, VI of the periodic system, in particular metal fluorides;

Nitrides of the groups III, IV, VI, VIII of the periodic system, in particular metal nitrides.

It will be observed that the foregoing compositions comprise chemical compounds containing at least one element of the second series of the periodic system with an atomic weight ranging between 14 and 19.

According to the method of production of such optical glasses provided by the present invention, said glasses are provided with several partial layers of the reflection-reducing and light-absorbing layer, the individual partial layers being capable of being applied by evaporation in a high vacuum, by spluttering or by means of a physical method involving a centrifugal process. Such thin layers may also be produced by chemical methods, such as, by reduction from solutions or by oxidation or reduction of gases or by oxidation or reduction of other substances by means of gases capable of reduction and oxidation respectively.

The application of the layers preferably takes place after the glasses have been given their shape.

Optical lenses provided with protective layers according to the invention are particularly suitable for use as sun glasses and welder's goggles, but also as sun protection screens or windshields for vehicles and the like.

Similarly it is also possible to fit such lenses into field glasses and telescopes or to provide one of the lenses of such instruments with the protective layers according to the invention. Furthermore the application of this invention to photographic filters and the like, particularly for snow and mountain photography, is readily feasible.

What I claim and wish to secure by Letters Patent is:

A light transmitting element comprising, in combination, a transparent lens base element, and a partially light-transmitting multi-layer coating on said base element, said coating comprising at least a first layer of chromimum directly on said base element, said first layer transmitting about 50% of visible light incident thereon, a substantially transparent stratum of silicon monoxide disposed on said first layer, said stratum having a thickness of about 140 m$\mu$, and a second layer of chromium disposed on said stratum, said second layer having a thickness less than said first layer and transmitting about 75% of visible light incident thereon, whereby visible light of a median wave length of about 560 m$\mu$ incident on said second layer will be transmitted with reduced intensity through said base element, in part due to absorption by said layers and in part due to reflection at said layers, interference between light reflected by said first and second layers, respectively, further minimizing said reflection.

References Cited in the file of this patent

UNITED STATES PATENTS

| | | |
|---|---|---|
| 722,901 | Reynolds et al. | Mar. 17, 1903 |
| 1,222,049 | Tillyer | Apr. 10, 1917 |
| 1,438,395 | Paisseau | Dec. 12, 1922 |
| 2,087,802 | Bayer Kruesay | July 10, 1937 |
| 2,220,861 | Blodgett | Nov. 5, 1940 |
| 2,239,642 | Burkhardt et al. | Apr. 22, 1941 |
| 2,338,234 | Dimmick | Jan. 4, 1944 |
| 2,370,697 | Tillyer | Mar. 6, 1945 |
| 2,432,657 | Colbert et al. | Dec. 16, 1947 |
| 2,456,899 | Strong | Dec. 21, 1948 |
| 2,590,906 | Tripp | Apr. 1, 1952 |
| 2,647,441 | Boydston et al. | Aug. 4, 1953 |

FOREIGN PATENTS

| | | |
|---|---|---|
| 716,153 | Germany | Jan. 14, 1942 |

OTHER REFERENCES

The Optician, March 10, 1944, pages 87 and 88.

"Reflection and Transmisison Interference Filters, Part I"; article by Hadley et al. in the Journal of the Optical Society of America, vol. 37, No. 6, June 1947, pages 451–465.

Journal of the Optical Society of America, vol. 37, No. 10, October 1947, pages 792–797.

"An Interference-Type Heat Reflecting Filter"; Article by Truner in the Journal of the Optical Society of America, vol. 37, No. 12, December 1947, pages 982–983.

"Reflection and Transmission Type Filters, Part II"; article by Hadley et al. in the Journal of the Optical Society of America, vol. 38, No. 6, June 1948, pages 483–496.

"Some Notes in a New Type of Filter"; article by Kemp in The British Journal of Photography, June 17, 1949, page 276.